(12) United States Patent
Masood

(10) Patent No.: US 7,930,630 B2
(45) Date of Patent: Apr. 19, 2011

(54) EVENT-BASED PARSER FOR MARKUP LANGUAGE FILE

(75) Inventor: Abid Masood, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 11/444,601

(22) Filed: May 31, 2006

(65) Prior Publication Data

US 2007/0283245 A1 Dec. 6, 2007

(51) Int. Cl.
 *G06F 17/00* (2006.01)
(52) U.S. Cl. ......... 715/234; 715/237; 715/242; 719/328
(58) Field of Classification Search .................. 715/234, 715/242, 237; 719/328
 See application file for complete search history.

(56) References Cited

U.S. PATENT DOCUMENTS

| | | | | |
|---|---|---|---|---|
| 6,631,379 | B2 | 10/2003 | Cox | 707/100 |
| 6,880,125 | B2 | 4/2005 | Fry | 715/513 |
| 7,089,567 | B2 * | 8/2006 | Girardot et al. | 719/330 |
| 7,134,072 | B1 * | 11/2006 | Lovett et al. | 715/234 |
| 7,472,345 | B2 * | 12/2008 | Hailey et al. | 715/234 |
| 7,552,384 | B2 * | 6/2009 | Marmigere et al. | 715/234 |
| 7,581,231 | B2 * | 8/2009 | Smith et al. | 719/328 |
| 7,644,414 | B2 * | 1/2010 | Smith et al. | 719/328 |
| 7,769,904 | B2 * | 8/2010 | Eller | 709/250 |
| 2002/0099734 | A1 | 7/2002 | Yassin et al. | 707/513 |
| 2004/0002952 | A1 | 1/2004 | Lee et al. | 707/1 |
| 2004/0205082 | A1 | 10/2004 | Fontoura et al. | 707/101 |
| 2004/0210828 | A1 | 10/2004 | Langer | 715/501.1 |
| 2005/0097455 | A1 | 5/2005 | Zhou et al. | 715/513 |
| 2005/0234844 | A1 * | 10/2005 | Ivanov | 707/1 |
| 2006/0020951 | A1 | 1/2006 | Fry et al. | 719/328 |

OTHER PUBLICATIONS

A Better XML Parser through Functional Programming, http://www.springerlink.com/(ongeucfzrtrg51muhgmiyiqr)/app/home/contribution.asp?referrer=parent&backto=issue,14,21; journa1,1621,3323;linkingpublicationresults,1:105633,1 (2 pgs).
Design of an XML based Interoperable RMI System:SoapRMI C++/Java 1.1, http://scholar.google.com/scholar?hl=en&lr=&q=cache:ULxNnTZSfuwJ:www.cs.binghamton.edu/~mgovinda/publications/papers/soaprmiDesign.ps+, (17 pgs).
Millau: an encoding format for efficient representation and exchange of XML over the Web, http://www9.org/w9cdrom/154/154.html, (27 pgs).

* cited by examiner

*Primary Examiner* — Stephen S Hong
*Assistant Examiner* — Matthew J Ludwig
(74) *Attorney, Agent, or Firm* — Merchant & Gould

(57) ABSTRACT

A parser uses SAX-like APIs for efficiency and provides DOM-like APIs for simplicity and convenience. The parser can read an XML document, for example, and parse its contents into a set of abstract information containers called nodes. The nodes are used to represent the structure and content of the document, which allows applications to read and manipulate the information in the document while not having to explicitly understand XML syntax. After a document is parsed, the nodes can be explored in any direction; they are not limited to straight-through text file processing.

20 Claims, 6 Drawing Sheets

```
<?xml version="1.0"?>                310
    <A attr1="a">      320
        <B>Example Contents</B>      340
    </A>    330
```
350 { (bracketing the A element block)

*Fig. 3*

401. startDocument
402. startElement - "A"
403. startElement - "B"
404. characters - "Example Contents"
405. endElement - "B"
406. endElement - "A"
407. endDocument

EVENT-BASED PARSER FOR MARKUP LANGUAGE FILE

BACKGROUND

A Document Object Model (DOM) is often used to parse XML data. DOM is often implemented in XML editors to provide a programmatic representation of XML documents, fragments, nodes, or node-sets. DOM can also be used to provide an application programming interface for working with XML data. As an XML representation, DOM typically conforms to the W3C DOM standard. As a set of application programmer interfaces (APIs), XML DOM objects are usually COM objects that can expose interfaces and be used in XML applications written in programming languages such as C/C++, Visual Basic, VBScript, and JScript.

When executed, the DOM loads the entire XML document in memory and represents as a tree structure that can be accessed by the set of provided APIs. However, this parsing by DOMs is often not very efficient (especially in a server software environment) because the server often processes several files at a time and each processed file can be arbitrary long. Loading whole files that are being processed in memory can unacceptably slow down the overall performance of the server and also cause Denial of Service situations.

Another parser, SAX (Simple API for XML), is a conventional standard for event-based parsing of XML documents. SAX typically defines an abstract programmatic interface that models the XML information set ("infoset") through a linear sequence of method calls. Although SAX and DOM are different, SAX and DOM both provide a different projection of the XML infoset onto programmatic types. Because SAX does not demand resources for an in-memory representation of the document, SAX provides a good alternative to the Document Object Model (DOM) and usually works especially well for arbitrarily large files.

SAX facilitates the search of large documents by extracting small pieces of information from a large document and allowing processing to be aborted after the information is located. However, the benefit of low memory usage requirements of SAX is offset by other disadvantages. For example, SAX often has difficulties managing context during processing when performing advanced queries.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The present disclosure is directed to a parser for parsing documents in markup (or markup-like) languages. The parser uses SAX-like APIs for efficiency and provides DOM-like APIs for simplicity and convenience. The parser can read a markup language document and parse its contents into a set of abstract information containers called nodes. The nodes are used to represent the structure and content of the document, which allows applications to read and manipulate the information in the document while not having to explicitly understand XML syntax, for example. After a document is parsed, the nodes can be explored in any direction; they are not limited to straight-through text file processing.

The parser can be an event-based XML parser that provides a DOM-like method for accessing serial XML data. The XML parser manages the local parser state in state machine form, which provides a set of events for nodes in XML parsing. A DOM-like XML parsing method is built on top of an event-based parser in which only a minimal number of events are read to generate a next node in the XML node tree.

These and other features and advantages will be apparent from a reading of the following detailed description and a review of the associated drawings. It is to be understood that both the foregoing general description and the following detailed description are explanatory only and are not restrictive of the invention as claimed. Among other things, the various embodiments described herein may be embodied as methods, devices, or a combination thereof. Likewise, the various embodiments may take the form of an entirely hardware embodiment, an entirely software embodiment or an embodiment combining software and hardware aspects. Furthermore, various markup languages can be used to provide the functionality of XML. The disclosure herein is, therefore, not to be taken in a limiting sense.

BRIEF DESCRIPTION OF THE DRAWINGS

FIG. 3 is an illustration of a listing of sample XML code.

DETAILED DESCRIPTION

Figure 1:
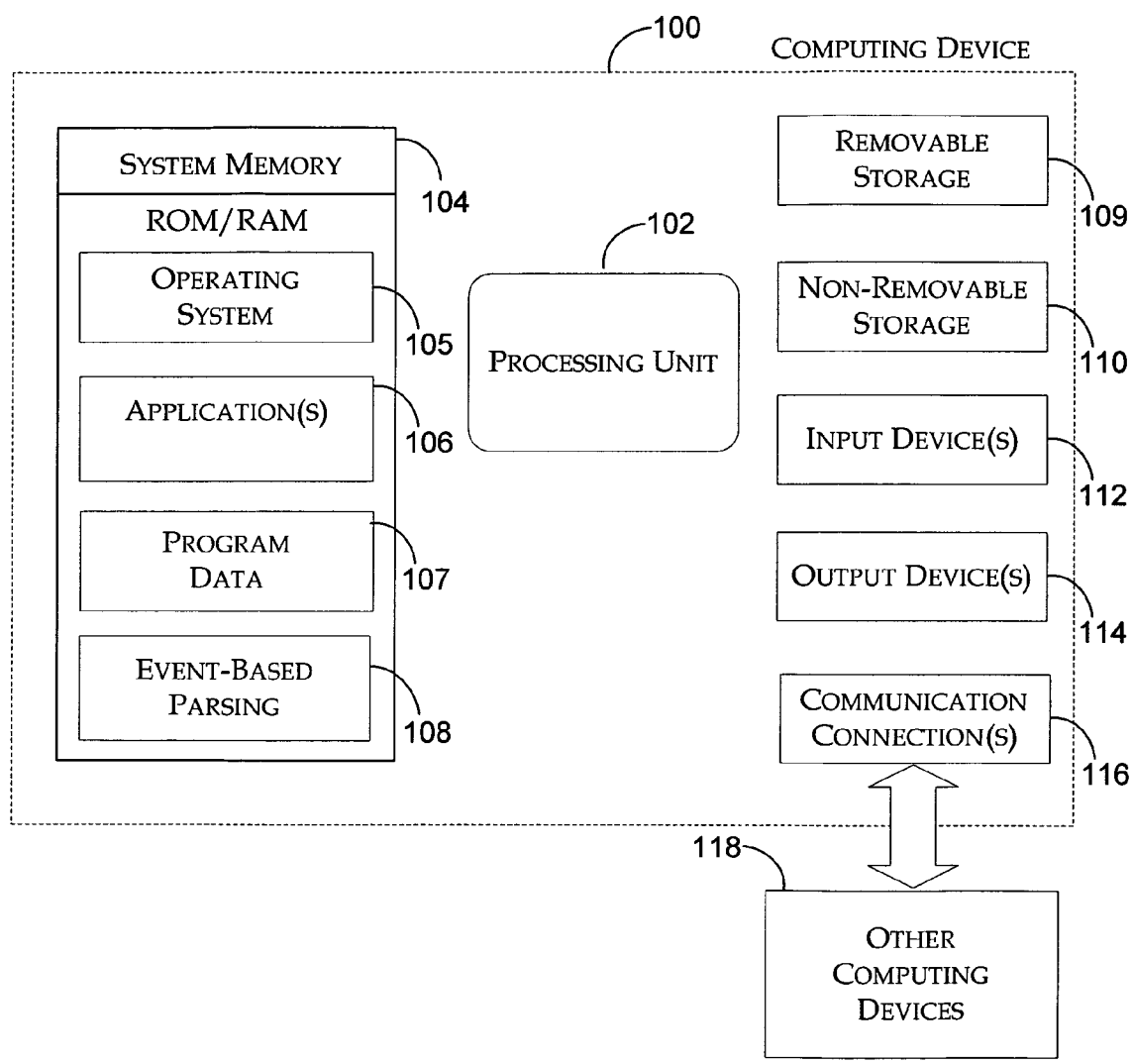
FIG. 1 is an illustration of an example operating environment and system for implementing DOM-like event-based XML parsing.

As briefly described above, embodiments are directed to an event-based XML parser. With reference to FIG. 1, one example system for implementing event-based parsing includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. Event-based parsing 108, which is described in detail below with reference to FIGS. 2-6, is implemented within system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
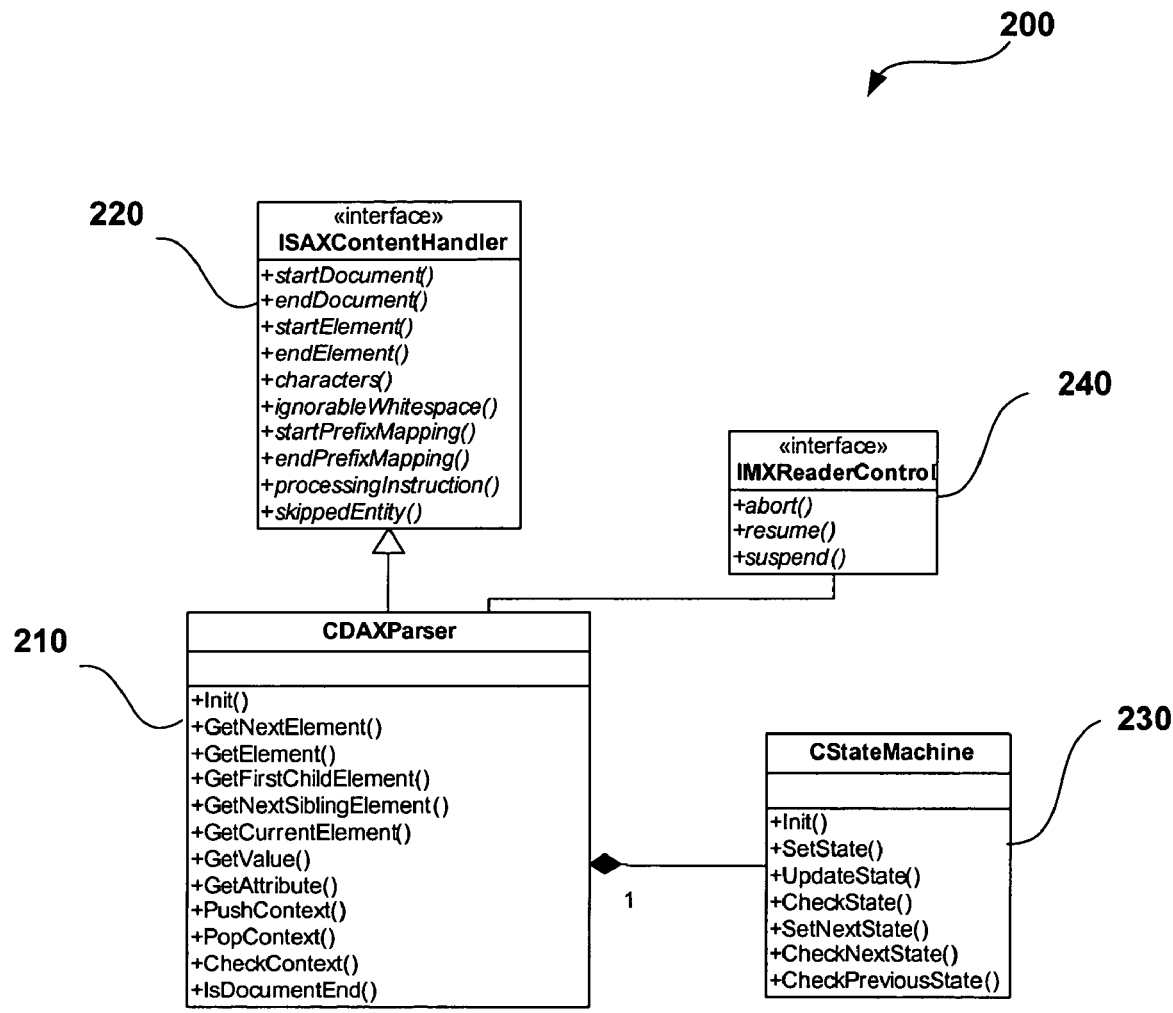
FIG. 2 is a top-level illustration of an architectural view of an event-based XML parser.

FIG. 2 is a top-level illustration of an architectural view of an event-based XML parser. As shown in the figure, a class diagram for parser 200 is shown with publicly exposed methods. In one embodiment, event-based parsers of client applications read XML documents in a forward direction (as opposed to DOM API, which allows reading in both directions). Other embodiments can incorporate caching of a subset of nodes to allow reverse reading of that subset of nodes.

Parser 200 comprises an external API class called CDAXParser 210 that implements ISAXContentHandler 220 callback methods (discussed below). CDAXParser 210 also comprises an internal class CStateMachine 230 to manage the state of the parser. In order to suspend and resume parser 200, the IMXReaderControl 240 interface is normally used.

ISAXContentHandler 220 callback methods comprise "COM" methods. The startDocument method is used for receiving notification of the beginning of an XML document to be parsed. The endDocument method is used for receiving notification of the end of a document. The startElement method is used for receiving notification of the beginning of an element. The endElement method is used for receiving notification of the end of an element. The characters method is used for receiving notification of character data.

The ignoreable Whitespace method is used for receiving notification of ignorable white space in element content. In various embodiments, this method is not called where the implementation is nonvalidating. The startPrefixMapping method is used for indicating the beginning of a namespace prefix that maps to a URI (universal resource indicator). The endPrefixMapping method is used to indicate the end of a namespace prefix that maps to a URI. The processingInstruction method is used for receiving notification of a processing instruction. The skippedEntry method is used for receiving notification of when an entity is skipped.

Any application which uses parser 200 typically implements a content handler class by implementing an ISAXContentHandler interface. When the parsing starts, the content handler class starts receiving notifications through above-mentioned implemented methods. The content handler class typically reacts in response to these notifications to successfully parse the input document.

FIG. 3 is an illustration of a listing of sample XML code. Line 310 is metadata, which can be used by an XML parser to detect version compatibility. Line 320 designates the beginning of a context 350 for element "A," while line 330 designates the end of context 350 for element "A." Line 340 demonstrates the context of the element "B."

Figure 4:
FIG. 4 is an illustration of an output of an event-based parser parsing the code of FIG. 3.

FIG. 4 is an illustration of an output of an event-based parser parsing the code of FIG. 3. Output 400 lists methods and parameters output by, for example, ISAXContentHandler 220 and received by CDAXParser 210. Line 401 indicates that an XML file has been opened for input. Line 402 indicates the beginning of the context for element "A." Line 403 indicates the beginning of the context for element "B." Line 404 shows a character string. Line 405 indicates the end of the context for element "B." Line 406 indicates the end of the context for element "A." Line 407 indicates the end of file for the XML file has been reached. As mentioned above, nodes are created for these events and stored in a stack for retrieval (in various embodiments) in backwards and/or forwards directions.

Figure 5:
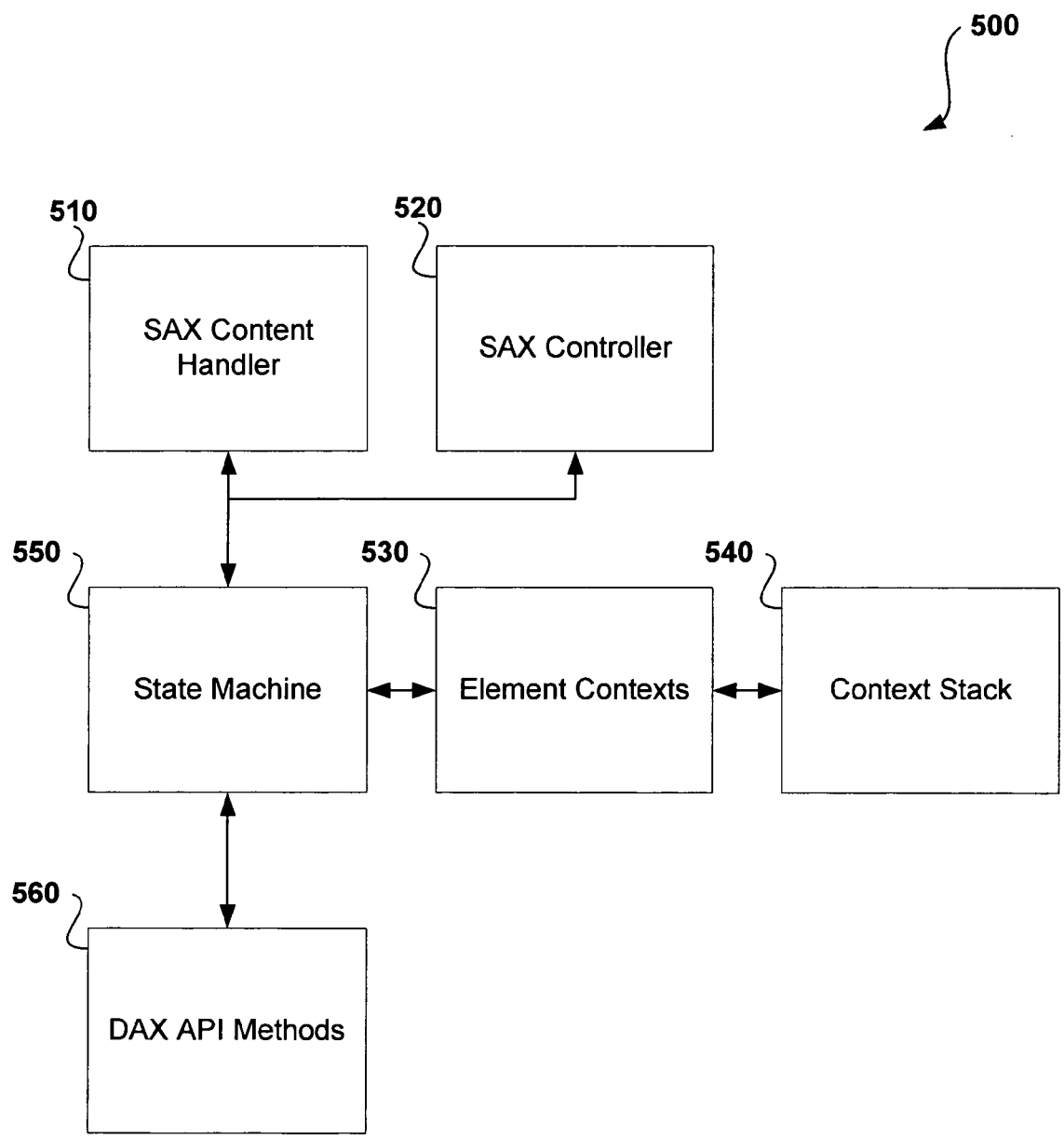
FIG. 5 is an illustration of an architectural view of an event-based XML parser incorporating a stack.

FIG. 5 is an illustration of an architectural view of an event-based XML parser incorporating a stack. Parser 500 is a SAX-like parser that can be implemented as a CDAXParser class that comprises methods SAX Content Handler 510, SAX Controller 520, Element Contexts 530, Context Stack 540, State Machine 550, and DAX API methods 560. CDAXParser class is used to implement ISAXContentHandler methods. Instances of the CDAXParser class typically receive all SAX notifications (as mentioned above) during parsing of XML content through SAX-like APIs.

SAX Controller 520 is typically created by the CDAXParser class. SAX Controller 520 is a SAX-like IMXReaderControl interface for controlling an event-based parser. By using suspend, resume, and abort methods, parser 500 can suspend or resume SAX-like parsing at any SAX notification completion boundary. In an embodiment, the whole implementation of DAX API methods 560 can rely upon suspending and resuming parser 500 at the appropriate state.

CDAXParser allows creating element contexts 530 for subsequent traversal of context nodes. Element Context 530 is a "remembered" parent element whose child elements (or the parent element itself) is currently being processed. A parent element can be remembered by storing the element context on context stack 540. Element Context 530 also marks the boundary for suspending parser 500. Every time parser 500 completes parsing any of the element contexts, parsing is normally suspended. Element Context 530 is used for searching a particular element from child elements of an XML element or focusing the parsing at a specific element and the element's children. A client of CDAXParser class can create multiple contexts on different elements.

As mentioned above, an element context 530 can be pushed in a context stack 540 every time the element context is created. When each endElement notification occurs, the element context stack 540 is checked to determine whether the last element context is completed or is currently being processed. If the final pushed context is completed, parsing can be suspended.

A list of states used by parser 500 is given in Table 1 as follows.

TABLE 1

| | |
|---|---|
| STATE_PARSER_START | DAX parser has been initialized. |
| STATE_PARSER_END | DAX parser has been ended. |
| STATE_START_DOCUMENT | Set at ISAXCiontentHandler.startDocument notification |
| STATE_END_DOCUMENT | Set at ISAXCiontentHandler.endDocument notification |
| STATE_START_ELEMENT | Set at ISAXCiontentHandler.startElement notification |
| STATE_END_ELEMENT | Set at ISAXCiontentHandler.endElement notification |
| STATE_CHARACTERS | Set at ISAXCiontentHandler.characters notification |
| STATE_SEARCH_ELEMENT | Set when searching an xml element. |
| STATE_CHILD_ELEMENT | Set when searching first child xml element. |
| STATE_SIBLING_ELEMENT | Set when searching sibling xml element. |
| STATE_SIMPLE_ELEMENT | Set at ISAXCiontentHandler.endElement notification when a simple element is parsed. A simple xml element is an element which does not has any children and has no value. e.g. <Heading/>, <Test id="123"/> |

A list of state machine methods used by parser 500 is given in Table 2 as follows:

TABLE 2

| | |
|---|---|
| Init | Initialize State machine. CDAXParser Calls init with STATE_PARSER_START |
| SetState | Sets the current state of CADXParser. If startDocument notification is received set the current state to STATE_START_DOCUMENT, if startElement notification is received then set the current state to STATE_START_ELEMENT, and the like. With the SetState call, the current state of state machine becomes the previous state. |
| GetElement | Search for an XML element in the read XML content or remaining XML context if called within an XML context. |
| UpdateState | Update the current state. CStaeMachine allows composite states as well. |
| CheckState | Compare the current state with the asked for state. |
| SetNextState | Set the next state. CDAXParser sets the next state to that state where parsing is to be suspended. |
| CheckNextState | Compare the next state with the asked state. |
| CheckPreviousState | Compare the previous state with the asked state. |

A list of API methods used by parser 500 is given in Table 3 as follows:

TABLE 3

| | |
|---|---|
| Init | Initialize DAX parser for given XML file name or stream |
| GetNextElement | Get next available xml element. If document is ended return FALSE. |
| GetElement | Search an XML element in the reaming xml content or remaining xml context if called within an xml context. |
| GetCurrentElement | Get the current XML element being processed. |
| GetFirstChildElement | Get First child element of the current element. If there are no child elements then return FALSE and suspend parsing at the next available element. |
| GetNextSiblingElement | Get next sibling element child element of the current element. If there are no remaining sibling elements then return FALSE and suspend parsing at the end of document. |
| GetValue | Get value of current XML element. If this element. Returns FALSE if no value is available. |
| GetAttributes | Get list of attributes of the current element. Returns FALSE if no attribute is available. |
| GetAttribute | Get attribute based on attribute name. Returns FALSE if attribute is not available. |
| PushContext | Push context at the current element being processed and return context id |
| PopContext | Pop the last pushed context |
| CheckContext | Compare specified context id with the current context id |
| IsDocumentEnd | Is parsing of the whole document has ended. |

Figure 6:
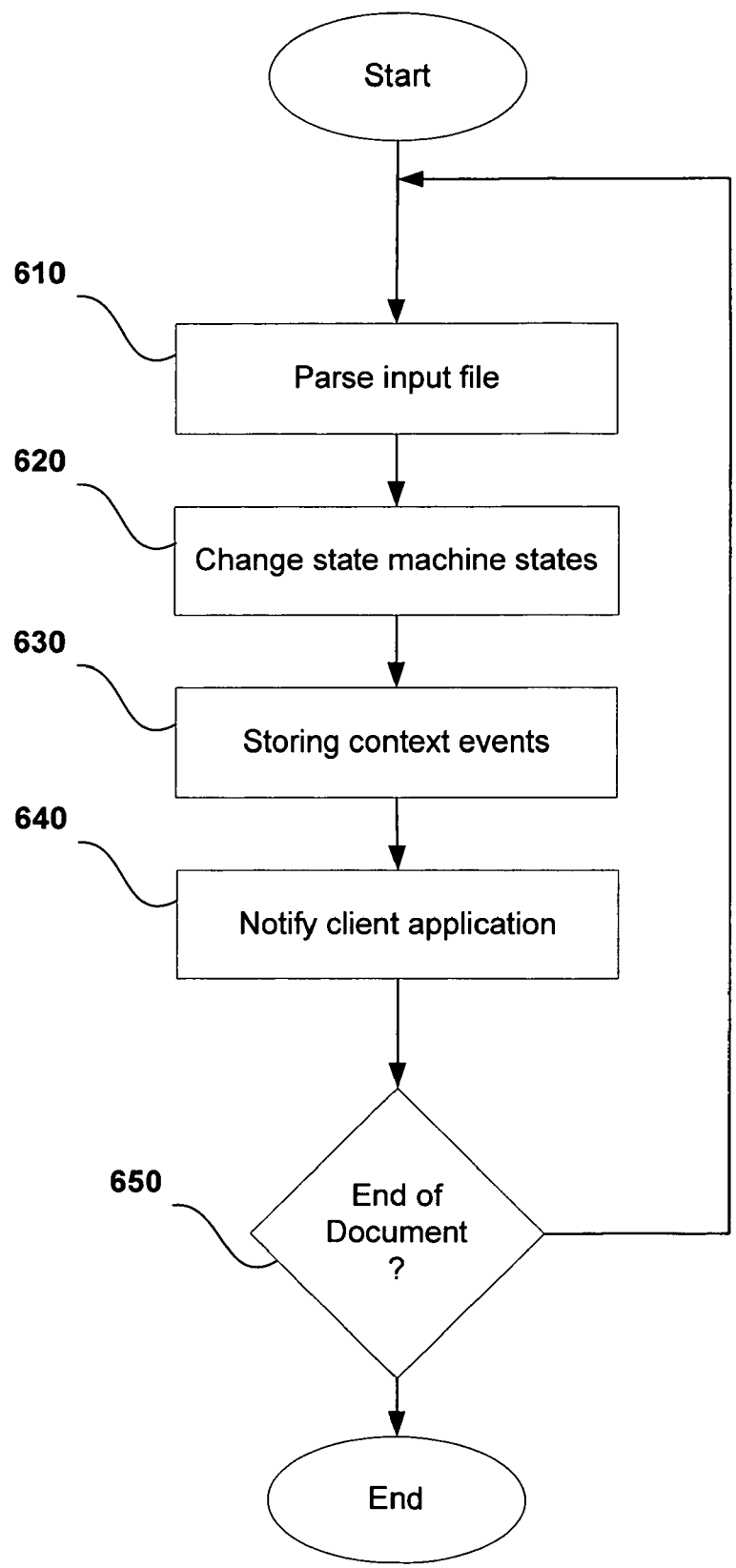
FIG. 6 is a flow graph of a process for an event-based parser for parsing of a markup language.

FIG. 6 is a flow graph of a process for event-based parsing of a markup language. A client application reads an input file, such as an XML file. In operation 610, a portion of the input file is parsed by the client application. The client application provides notifications using an API, for example, to notify a parser class that comprises a state machine.

In operation 620, the current state of the state machine is changed in response to notifications received by the parser class. The notifications comprise events such as start of document, end of document, start of element, end of element, character elements, and other notifications useful for parsing.

Composite states (and parallel state machines) can be implemented in various embodiments.

Additionally, the process can be used to allow client applications to read XML from an input file in a forward direction (as in a SAX-like parser), or in both directions (as in a DOM-like parser). Reading in both directions can be implemented by incorporating caching of a subset of nodes to allow reverse reading of that subset of node.

In operation 630, context events are stored in response to the notifications and changes in state of the state machine. Every time a context is created, the created context is pushed in a context stack. The context stack can be used to "remember" the hierarchy (e.g., context) of the parsed elements. The element context is a remembered parent element whose child elements or the parent element itself is currently being processed. The boundary for suspending the parser also occurs during the boundary of the element context. The parser is typically suspended when the parser completes parsing of an element context.

In operation 640, the client application is called to provide the client application with the results of the process. The client application can be called with calls to ISAXContentHandler when, for example, results are available from the process.

In operation 650, the context stacked is checked upon each endElement notification to determine whether the context has been completed. If the final pushed context has been completed, parsing is suspended.

Pseudo-code that is suitable for implementing parser 500 is given as follows:

```
Method: CDAXParser::Init
Parameters: xml Filename or Stream
Return Value: Status
PseudoCode:
    1.  Initialize State Machine with state (STATE_PARSER_START)
    2.  Initialize SAX with a given xml file name or xml stream
    3.  SetNextState(STATE_START_DOCUMENT) and ResumeSAXParser
Method: CDAXParser::GetNextElement
Parameters: None
Return Value: xmlElement
PseudoCode:
    1.  IF CheckState(STATE_END_DOCUMENT) return FALSE
    2.  SetNextState (STATE_START_ELEMENT OR STATE_END_DOCUMENT) and ResumeSAXParser
    3.  IF CheckState (STATE_START_ELEMENT OR STATE_SIMPLE_ELEMENT )
    4.  THEN return currentXmlElement
    5.  ELSE return FALSE.
Method: CDAXParser::GetElement
Parameters: xmlSearchElement
Return Value: xmlElement
PseudoCode:
    1.  IF CheckState(STATE_END_DOCUMENT) return FALSE
    2.  Store xmlSearchElement
    3.  SetNextState(STATE_SEARCH_ELEMENT OR STATE_END_DOCUMENT) and ResumeSAXParser
    4.  IF CheckState(STATE_SEARCH_ELEMENT)
    5.  THEN return currentXMLElement
    6.  ELSE return FALSE.
Method: CDAXParser:: GetCurrentElement
Parameters: None
Return Value: xmlElement
PseudoCode:
    1.  IF CheckState(STATE_START_DOCUMENT OR STATE_END_DOCUMENT) return FALSE
    2.  ELSE return currentXmlElement.
Method: CDAXParser:: GetFirstChildElement
Parameters: None
Return Value: xmlElement
PseudoCode:
    1.  IF CheckState(STATE_END_DOCUMENT OR STATE_END_ELEMENT) return FALSE
    2.  SetNextState(STATE_CHILD_ELEMENT OR STATE_END_DOCUMENT) and ResumeSAXParser
    3.  IF CheckState(STATE_CHILD_ELEMENT)
    4.  THEN return currentXMLElement
    5.  ELSE return FALSE.
Method: CDAXParser:: GetNextSiblingElement
Parameters: None
Return Value: xmlElement
PseudoCode:
    1.  IF CheckState(STATE_END_DOCUMENT) return FALSE
    2.  SetNextState(STATE_SIBLING_ELEMENT OR STATE_END_DOCUMENT) and ResumeSAXParser
    3.  IF CheckState(STATE_SIBLING_ELEMENT)
    4.  THEN return currentXMLElement
    5.  ELSE return FALSE.
Method: CDAXParser:: GetValue
Return Value: valueBuffer
PseudoCode:
    1.  IF CheckState(STATE_END_DOCUMENT OR STATE_END_ELEMENT) return FALSE
    2.  SetNextState(STATE_CHARACTERS OR STATE_START_ELEMENT OR STATE_END_ELEMENT OR
          STATE_END_DOCUMENT) and ResumeSAXParser
    3.  IF CheckState(STATE_CHARACTERS) THEN return valueBuffer
    4.  ELSE return FALSE.
Method: CDAXParser:: GetAttributes
Return Value: attributeValue List
PseudoCode:
    1.  IF CheckState(STATE_END_DOCUMENT ) return FALSE
    2.  Get stored xmlAttributes list of currentXmlElement if list is not empty return xmlAttributes list
    3.  ELSE return FALSE.
```

```
Method: CDAXParser:: GetAttribute
Parameter: attributeName
Return Value: attributeValue
PseudoCode:
    1.  IF CheckState(STATE_END_DOCUMENT ) return FALSE
    2.  Get xmlAttributes list of currentXmlElement IF list is not empty
    3.  THEN search for the attributeName IF found return attributeValue
    4.  ELSE return FALSE.
    5.  ELSE return FALSE.
Method: CDAXParser:: PushContext
Parameter: None
Return Value: contextID
PseudoCode:
    1.  IF CheckState(STATE_END_DOCUMENT OR STATE_END_ELEMENT) return FALSE
    2.  Create new contextID
    3.  Insert contextID in contextIDList.
    4.  Push contextID and currentXmlElement in contextIDStack
    5.  return contextID
Method: CDAXParser:: PopContext
Parameter: None
Return Value: None
PseudoCode:
    1.  IF length of contextIDStack is greater than 0
    2.  THEN Pop contextID and xmlElement from contextIDStack and Remove contextID from contextIDList
Method: CDAXParser:: CheckContext
Parameter: contextID
Return Value: Status
PseudoCode:
    1.  IF found contextID in contextIDList
    2.  THEN return TRUE
    3.  ELSE return FALSE
Method: CDAXParser:: IsDocumentEnd
Parameter: None
Return Value: Status
PseudoCode:
    1.  IF CheckState(STATE_END_DOCUMENT )
    2.  THEN return TRUE
    3.  ELSE return FALSE
```

Pseudo-code for an implementation of SAXContentHandler 510 interface methods is given below. The listed methods are usually private to CDAXParser. The listed methods are typically called by parser 500 during parsing.

```
Method: CDAXParser:: startDocument
Parameter: None
Return Value: None
PseudoCode:
    1. SetState(STATE_START_DOCUMENT )
    2. IF CheckNextState(STATE_START_DOCUMENT ) THEN SuspendSAXParser
Method: CDAXParser:: endDocument
Parameter: None
Return Value: None
PseudoCode:
    1. SetState(STATE_END_DOCUMENT )
    2. IF CheckNextState(STATE_END_DOCUMENT ) THEN SuspendSAXParser
Method: CDAXParser:: startElement
Parameter: SAX's currentXmlElement, SAX's xmlAttributes
Return Value: None
PseudoCode:
    1. SetState(STATE_START_ELEMENT)
    2. Save SAX's currentXmlElement
    3. Save SAX's xmlAttributes
    4. Increment xmlElementDepth
    5. IF CheckNextState(STATE_START_ELEMENT) THEN SuspendSAXParser and Return
    6. IF CheckNextState(STATE_SIBLING_ELEMENT) AND xmlElementDepth == xmlSearchDepth
    7. THEN UpdateState(STATE_SIBLING_ELEMENT) and SuspendSAXParser and Return
    8. IF CheckNextState(STATE_SEARCH_ELEMENT) AND currentXmlElement == xmlSearchElement
    9. THEN UpdateState(STATE_SEARCH_ELEMENT) and SuspendSAXParser and Return
    10. IF CheckNextState(STATE_CHILD_ELEMENT)
    11. THEN UpdateState(STATE_CHILD_ELEMENT) and SuspendSAXParser and Return
```

-continued

```
Method: CDAXParser:: endElement
Parameter: SAX'S currentXmlElement
Return Value: None
PseudoCode:
   1. Set State(STATE_END_ELEMENT)
   2. decrement xmlElementDepth
   3. IF length of contextIDStack is greater than 0 AND elementDepth of top of contextIDStack is greater than
      xmlElementDepth
   4. THEN PopContext and SuspendSAXParser
   5. IF CheckPreviousState (STAE_START_ELEMENT) THEN UpdateState(STATE_SIMPLE_ELEMENT)
   6. IF CheckNextState(STATE_END_ELEMENT) THEN SuspendSAXParser and Return
   7.
   8. IF CheckNextState(STATE_SIBLING_ELEMENT) AND xmlElementDepth less than xmlSearchDepth
   9. THEN set xmlSearchDepth = 0 and SuspendSAXParser and Return
  10. IF CheckCurrentState is (STATE_SIMPLE_ELEMENT) AND CheckNextState(STATE_SEARCH_ELEMENT) AND
      currentXmlElement == xmlSearchElement
  11. THEN UpdateState (STATE_SEARCH_ELEMENT) and SuspendSAXParser and Return
  12. IF CheckState(STATE_SIMPLE_ELEMENT) AND CheckNextState (STATE_CHILD_ELEMENT)
  13. THEN SuspendSAXParser and Return
Method: CDAXParser:: characters
Parameter: SAX's valueBuffer
Return Value: None
PseudoCode:
   1. IF CheckState (STATE_START_ELEMENT) == FALSE THEN return
   2. SetState (STATE_CHARACTERS)
   3. IF CheckNextState(STATE_CHARACTERS)
   4. THEN store SAX's valueBuffer and SuspendSAXParser
```

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method for parsing an input file in a markup language, comprising:
   utilizing an Application Programmer Interface (API) to parse the input file, wherein the API includes methods comprising: a get next element method, a get element method, a get current element method, a get first child element method, a get next sibling element method, a get value method, a get attribute method, a push context method, a pop context method, and a check context method;
   parsing the input file using the API into nodes that represent a structure and content of the input file; wherein after the input file is parsed into the nodes, the nodes are explorable in any direction, wherein the input file is parsed in a forward direction or in the forward direction and a reverse direction;
   changing states in a state machine using the API in response to context events encountered while parsing the input file; and
   storing context events in a stack in response to changes in the state machine.

2. The method of claim 1 wherein methods of the API further comprise state machine methods that comprise: a set state method, a get element method, an update state method, a check state method, a set next state method, a check next state method and a check previous state method.

3. The method of claim 1 wherein the context events are stored in the stack in response to a notification that a "start of element" state has been encountered.

4. The method of claim 3 further comprising forming a hierarchy of nodes in response to the context event.

5. The method of claim 4 further comprising traversing at least a portion of the hierarchy of nodes after the parsing of the input document has finished.

6. The method of claim 5 further comprising traversing the entire hierarchy of nodes after the parsing of the input document has finished.

7. The method of claim 1 further comprising using a content handler to receive notifications of event changes encountered while parsing the input file.

8. The method of claim 7 wherein the notifications of event changes comprise "start of document," "end of document," "start of element," and "end of element" notifications.

9. The method of claim 8 further wherein the state machine comprises states that comprise start "start of document," "end of document," "start of element," and "end of element" states.

10. The method of claim 1 wherein parsing is suspended at an element context boundary.

11. The method of claim 1 further comprising providing a control interface for controlling a parser for parsing the input file.

12. The method of claim 1 wherein the control interface comprises "start" and "suspend" commands.

13. The method of claim 12 further comprising searching for a particular element from child elements of a markup language element by using the element context.

14. A system for event-based parsing of an input file, comprising:
   a processor, a memory and a computer-readable storage medium;
   an Application Programmer Interface (API) that is used in parsing the input file, wherein the API includes methods comprising: a get next element method, a get element method, a get current element method, a get first child element method, a get next sibling element method, a get value method, a get attribute method, a push context method, a pop context method, and a check context method;
   a content handler comprising methods executing on the processor for receiving notification of parsing events that occur while parsing the input file; wherein the input file is parsed using the API into nodes that represent a structure and content of the input file; wherein after the input file is parsed into the nodes, the nodes are explorable in any direction, wherein the input file is parsed in a forward direction or in the forward direction and a reverse direction;

a state machine that changes state in response to the received notifications; and a context stack for storing a hierarchy of parsed elements.

15. The system of claim 14 wherein the system stores an entire hierarchy of the parsed elements.

16. The system of claim 14 further comprising an interface can suspend or resume parsing at a notification completion boundary.

17. A computer-readable storage medium comprising computer-executable instructions encoded on a memory device, comprising:

providing an Application Programmer Interface (API) that is used in parsing the input file, wherein the API includes methods comprising: a get next element method, a get element method, a get current element method, a get first child element method, a get next sibling element method, a get value method, a get attribute method, a push context method, a pop context method, and a check context method;

parsing the input file using the API into nodes that represent a structure and content of the input file; wherein after the input file is parsed into the nodes, the nodes are explorable in any direction, wherein the input file is parsed in a forward direction or in the forward direction and a reverse direction;

changing states in a state machine in response to context events encountered while parsing the input file;

storing context events in a stack in response to changes in the state machine; and suspending parsing of the input file in response to a notification of a completed element context.

18. The computer-readable storage medium of claim 17 further comprising using a content handler to receive notifications of event changes encountered while parsing the input file.

19. The computer-readable storage medium of claim 17 further comprising providing a control interface for controlling a parser for parsing the input file.

20. The computer-readable storage medium of claim 17 further comprising traversing the hierarchy of nodes after the parsing of the input document has finished.

* * * * *